Sept. 1, 1970  E. A. SMITH  3,526,323

FILTER BAG RESTRAINER

Filed Nov. 26, 1968

INVENTOR
EDWARD A. SMITH
BY
Smythe & Moore
ATTORNEYS

United States Patent Office 3,526,323
Patented Sept. 1, 1970

3,526,323
FILTER BAG RESTRAINER
Edward A. Smith, Glenville, Conn., assignor to GAF Corporation, Glenville, Conn., a corporation of Delaware
Filed Nov. 26, 1968, Ser. No. 779,157
Int. Cl. B01d 29/30
U.S. Cl. 210—460                                2 Claims

ABSTRACT OF THE DISCLOSURE

A restrainer for a felt filter bag or the like positioned on an adapter head containing an inlet for material to be filtered comprising an open top foraminous metallic receptacle contoured closely to surround the filter bag, and provided with resilient members extending across the top of the adapter head permitting the restrainer to yield to excessive pressure in the filter bag while precluding slippage of the bag from the adapter head.

---

This invention relates to a filter bag restrainer, and more particularly to such a device for resiliently retaining a felt filter bag in position on an adapter head located interiorly of a pressure vessel in a pressure filtering system.

One of the objects of the invention is the provision of a restrainer of foraminous material which is positioned over a filter bag of this nature, and resiliently secured on the adapter head in order to preclude dislodgment of the filter bag from the adapter head or displacement of the adapter head in the event that pressure inside the bag becomes excessive.

An additional object of the invention is the provision of yieldable resilient means for retaining the restrainer on the bag and on the adapter head so that excess pressure will simply cause yielding of the restrainer and positively preclude dislodgment of the filter bag and its falling into the previously filtered material.

Another object of the invention is the provision of a device of this character particularly adapted for use with a felt strainer bag of the shape set forth and described in co-pending application Ser. No. 594,619, filed Nov. 15, 1966 now U.S. Pat. No. 3,419, 151.

An additional object of the invention is the provision of a restrainer of this nature which is simple and inexpensive to manufacture and which may be readily applied to and removed from an adapter head in a pressurized vessel with a minimum of effort and difficulty.

In a preferred aspect of the invention, the restrainer is comprised of foraminous material such as wire mesh or screen, and is shaped to conform to a filter bag of the type described. The bag has an open top surrounded by a band of resilient or yieldable material having a peripheral annular flange. A pair of resilient members, such as coil springs, have their opposite ends secured in substantially diametrically opposed openings in the flange, and are adapted to extend diametrically across the adapter head on opposite sides of the inlet pipe to yieldably hold the restrainer in position.

Other objects, advantages and features of the invention will become apparent from the following description and drawing which are merely exemplary.

In the drawings.

Similar reference characters refer to similar parts throughout the several views of the drawing.

Figure 1:
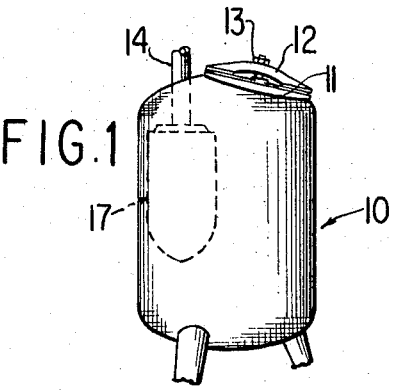
FIG. 1 is a side elevational view of a pressure vessel used in a filtering system for filtering relatively viscous materials such as paint, fruit juice, oil, wax, etc., showing the location of the filter bag of the filter restrainer.

A pressurized filter tank 10 is generally indicated having an opening 11, a clamping bar 12, and yoke bolt and nut 13 for holding a cover in sealed condition. An inlet pipe 14 admits liquid to be filtered to the interior of the vessel. A dish-shaped adapter head 15 (FIG. 3) is positioned on the threaded end 16 of the inlet pipe, and supports a felt filter bag generally indicated at 17 and the filter restrainer 18. Adapter head 15 includes a plate portion 20 having a depending annular portion 21 and an outwardly extending right angularly disposed flange 22, the latter serving as a seat for a flexible band 23 surrounding the open top of a felt filter bag 24, one form of bag particularly adapted for this purpose disclosed in co-pending applications, Ser. No. 594,619, filed Nov. 15, 1966, and Ser. No. 599,661, filed Nov. 15, 1966, now U.S. Pat. No. 3,464,561.

Adapter head 15 also may include a central depending boss 25 which is interiorly threaded to engage the threaded end 16 of inlet pipe 14.

The restrainer of the instant invention comprises a foraminous bag 26 which may be composed of wire screen, wire mesh, perforated metal, plastic, or other suitable material, and includes a lower rounded bottom portion 27 contoured to conform to the rounded bottom or hemispherically shaped bottom 28 of filter bag 17.

Figure 2:
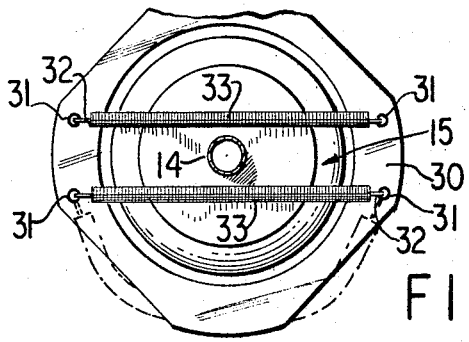
FIG. 2 is a top plan view showing the adapter head and the filter restrainer.
Figure 3:
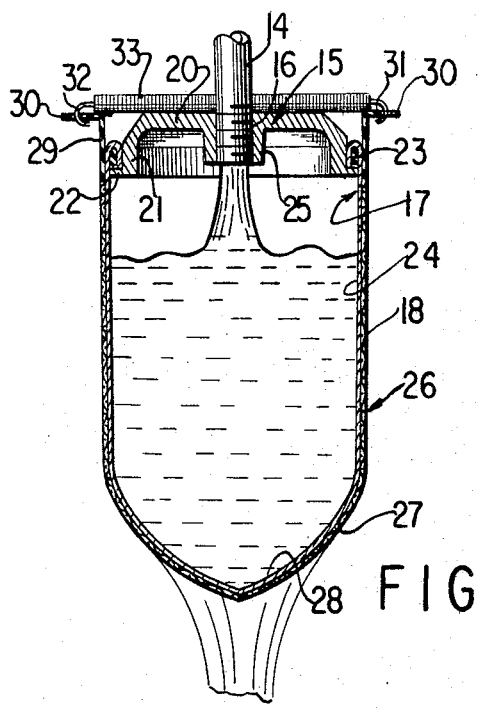
FIG. 3 is a longitudinal sectional view taken substantially along the center line of the adapter head filter bag and filter restrainer.
Figure 4:
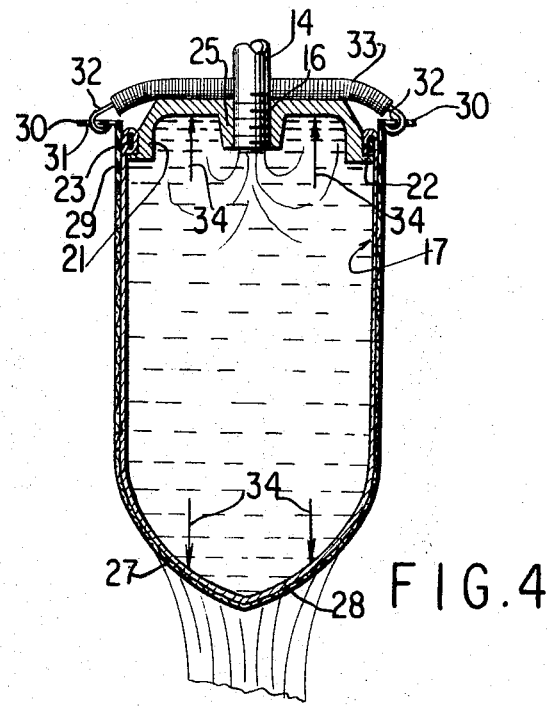
FIG. 4 is a view similar to FIG. 3, but showing the components under pressure of material to be filtered in the strainer.

The upper open end of the restrainer is provided with an annular band 29 of flexible material such as hard rubber or the like, which is provided at its top with outwardly extending oppositely disposed flanges 30, each having a pair of openings 31 therethrough into which engage the hooked ends 32 of a pair of parallel coil springs 33. The coil springs 33 engage over the top of adapter head 15 as best shown in FIGS. 2 and 3, and normally retain the restrainer in the position shown in FIG. 3. When excess pressure builds up, the oppositely exerted forces indicated by the arrows 34 in FIG. 4 will cause springs 33 to yield, permitting the restrainer to yield downwardly to the force of pressure. The band 29 retains the resilient rim 23 of the filter bag firmly seated on its associated seating flange 22 to preclude the disengagement and dislodgment of the filter bag under temporary conditions of abnormal pressure.

Figure 5:
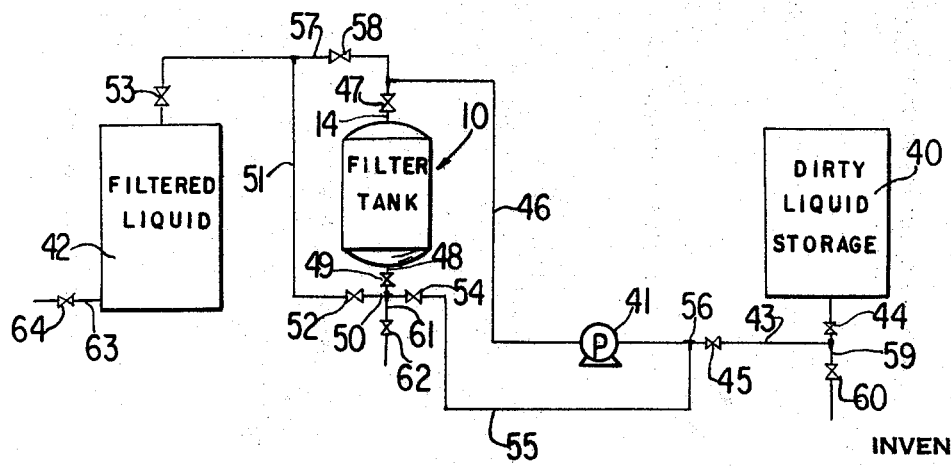
FIG. 5 is a schematic view showing one form of system with which the filter restrainer is adapted to be employed.

One example of use is seen in FIG. 5, filter tank 10 containing filter bag 17 and filter restrainer 18. The system additionally includes a storage tank 40 for liquid to be filtered, a pump 41 and a receiving tank 42 for filtered liquid. An inlet pipe 43 provided with a pair of valves 44 and 45, extends from the storage tank to pump 41, from which a line 46 extends through a valve 47 to inlet 14 of filter tank 10. The filter tank is provided with an outlet 48 which extends through a valve 49 to a T 50 from which one line 51 extends through valves 52 and 53 to tank 42. The other leg of the T extends through a valve 54 and a line 55 back to line 43 at a junction point 56 between valve 45 and pump 41. A liquid evacuating bypass line 57 provided with a valve 58 extends from line 46 to line 51, bypassing inlet 14 of filter tank 10.

A drainage line 59 having a valve 60 is provided for the liquid storage tank, as is a drainage line 61 having a valve 62, for the filter tank. Filtered liquid may be removed from tank 42 in any desired manner, as through an outlet 63 provided with a valve 64.

In the normal operation of the system above described, valves 44, 45, 47, 49, 52, and 53 are all open, permitting liquid from tank 40 to be pumped through the filter tank and its associated filter and filter restrainer, directly to tank 42, all other valves being closed. When it is desired to recirculate liquid for refiltering, valve 52 is closed and valve 54 is opened, permitting filtered liquid from the tank to be recirculated through the pump 41 to the inlet 14. The valve 45 may be open or closed during this operation to admit some dirty liquid, or simply to recirculate the already filtered liquid from filter tank 10. When it is desired to evacuate all clean liquid from the vessel, the valves are set as in the recirculating step above described, and valve 58 is opened, permitting all the liquid from the tank and from lines 55, 46 and 51 to be evacuated into tank 42, it being understood that valve 45 is closed during this operation.

It should be apparent that variations in the details of construction and materials can be used without departing from the spirit of the invention except as defined in the appended claims.

What is claimed is:

1. A restrainer for a filter bag comprising dish-shaped support means having an inlet pipe, an annular flange on said support means, filter bag means having an open top, a flexible band surrounding said top and fitting on said flange, receptacle means of foraminous material having an open top and contoured to surround said filter bag means supported on said support means, a resilient band surrounding the open top of said receptacle means, annular flange means extending laterally from said resilient band, and resilient means extending across the top of said support means and anchored to said resilient band for yieldably holding said receptacle means on said support means for retaining said filter bag thereon.

2. The structure of claim 1 wherein said resilient means comprise coil springs, and the ends of said springs are engaged in openings in said resilient band flange.

References Cited

UNITED STATES PATENTS

| | | | |
|---|---|---|---|
| 2,202,049 | 5/1940 | Fitzgerald | 210—460 |
| 3,214,369 | 10/1965 | Felix | 210—193 X |

JAMES DECESARE, Primary Examiner

U.S. Cl. X.R.

210—484